(12) United States Patent
Song

(10) Patent No.: US 12,384,402 B2
(45) Date of Patent: Aug. 12, 2025

(54) APPARATUS AND METHOD FOR PROVIDING DISTANCE TO EMPTY INFORMATION FOR A VEHICLE

(71) Applicants: HYUNDAI MOTOR COMPANY, Seoul (KR); KIA CORPORATION, Seoul (KR)

(72) Inventor: Kyeong Soo Song, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 93 days.

(21) Appl. No.: 18/534,260

(22) Filed: Dec. 8, 2023

(65) Prior Publication Data

US 2025/0058790 A1    Feb. 20, 2025

(30) Foreign Application Priority Data

Aug. 14, 2023    (KR) .................. 10-2023-0106088

(51) Int. Cl.
  *B60W 50/14*    (2020.01)
  *B60K 35/28*    (2024.01)
  *B60L 58/13*    (2019.01)

(52) U.S. Cl.
  CPC .............. *B60W 50/14* (2013.01); *B60K 35/28* (2024.01); *B60L 58/13* (2019.02);
  (Continued)

(58) Field of Classification Search
  CPC .......... B60W 50/14; B60W 2050/146; B60W 2510/244; B60W 2530/209; B60K 35/28;
  (Continued)

(56) References Cited

U.S. PATENT DOCUMENTS 9,037,327 B2    5/2015  Kim
9,574,889 B2    2/2017  Kim et al.
(Continued)

FOREIGN PATENT DOCUMENTS

JP    2021141673 A    9/2021
KR    102015168 B1    8/2019
(Continued)

*Primary Examiner* — Brian A Zimmerman
*Assistant Examiner* — Cal J Eustaquio
(74) *Attorney, Agent, or Firm* — Lempia Summerfield Katz LLC

(57) ABSTRACT

A method provides information on a distance to empty (DTE) of a vehicle and an information providing apparatus performs the method. The method includes: determining average fuel efficiency based on a travel distance of a vehicle and the cumulative amount of electrical power consumption after start of one driving cycle by vehicle key-on; determining short fuel efficiency by averaging fuel efficiencies calculated at a predetermined travel distance interval after the start of one driving cycle; determining an average fuel efficiency application ratio corresponding to vehicle driving information after the start of one driving cycle using setting information; determining a guide DTE value reflecting the average fuel efficiency and the short fuel efficiency according to the average fuel efficiency application ratio; and controlling operation of a display device to display the guide DTE value.

20 Claims, 14 Drawing Sheets

(52) U.S. Cl.
CPC ..... *B60K 2360/169* (2024.01); *B60L 2250/16* (2013.01); *B60L 2260/52* (2013.01); *B60L 2260/54* (2013.01); *B60W 2050/146* (2013.01); *B60W 2510/244* (2013.01); *B60W 2530/209* (2020.02)

(58) Field of Classification Search
CPC .............. B60K 2360/169; B60K 35/22; B60K 2360/174; B60K 35/00; B60K 35/29; B60L 58/13; B60L 2250/16; B60L 2260/52; B60L 2260/54; B60L 3/12; B60L 58/12; G08G 1/0116; G08G 1/0129; G08G 1/0137; B60Y 2200/91; Y02T 10/72
See application file for complete search history.

(56) References Cited

U.S. PATENT DOCUMENTS

| | | |
|---|---|---|
| 10,124,675 B2 | 11/2018 | Lu et al. |
| 11,361,595 B2 | 6/2022 | Zeng et al. |
| 2021/0278229 A1 | 9/2021 | Kazuno |
| 2022/0097557 A1 | 3/2022 | Lee et al. |
| 2022/0176939 A1* | 6/2022 | Poll ..................... B60W 10/26 |

FOREIGN PATENT DOCUMENTS

| | | |
|---|---|---|
| KR | 20210062205 A | 5/2021 |
| KR | 20220095298 A | 7/2022 |

* cited by examiner

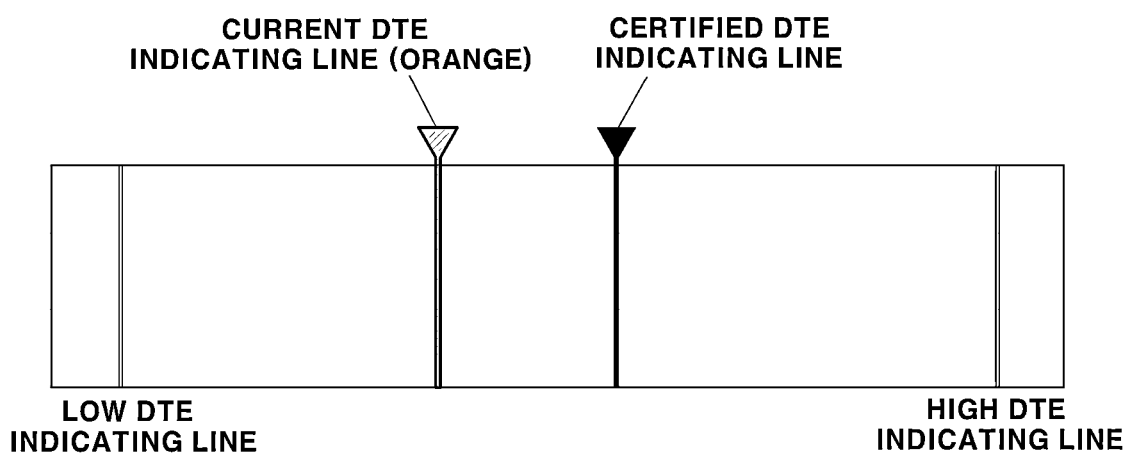

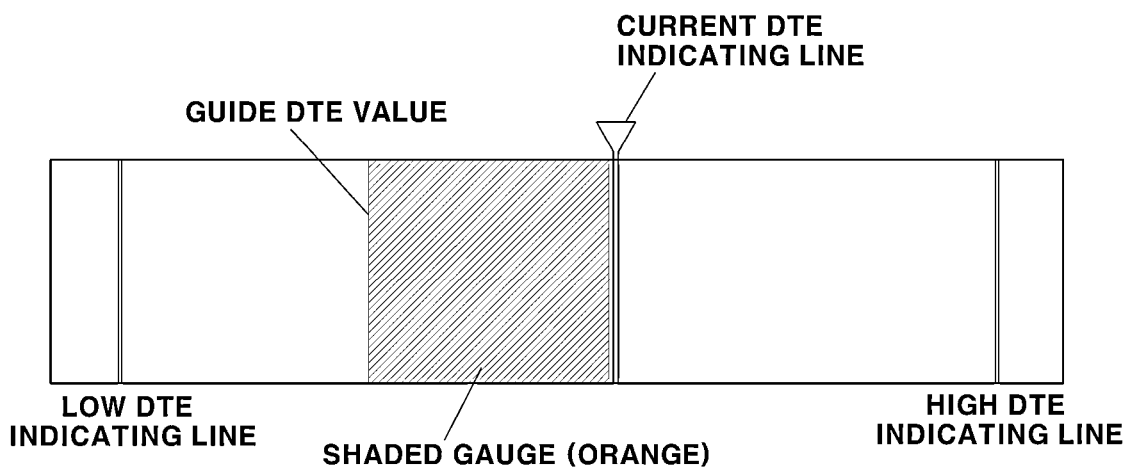

APPARATUS AND METHOD FOR PROVIDING DISTANCE TO EMPTY INFORMATION FOR A VEHICLE

CROSS-REFERENCE TO RELATED APPLICATION

This application claims under 35 U.S.C. § 119(a) the benefit of priority to Korean Patent Application No. 10-2023-0106088 filed on Aug. 14, 2023, the entire contents of which are incorporated herein by reference.

BACKGROUND

(a) Technical Field

The present disclosure relates to an apparatus and method for providing information on a distance to empty of an electric vehicle to a driver by displaying the information through a display device such as an instrument cluster.

(b) Discussion of the Related Art

In general, a vehicle is configured to perform a function of estimating a distance to empty (DTE) and to provide the estimated DTE to a driver. For example, an internal combustion engine vehicle has a function of estimating a DTE based on a fuel level in a fuel tank and providing the estimated DTE to a driver through an instrument cluster.

Similarly, an electric vehicle, which travels by driving a motor using the power of a battery, has a function of estimating a DTE based on the current remaining energy (state of charge) of the battery and displaying the estimated DTE on an instrument cluster.

Compared to internal combustion engine vehicles, the number of charging stations for electric vehicles is small, and charging times are long or relatively slow. Therefore, drivers of electric vehicles are increasingly interested in DTE information.

Because drivers of electric vehicles are very sensitive to the DTE, it is important to accurately calculate the DTE of a vehicle corresponding to the remaining energy of a battery in real-time during travel and to notify a driver of the DTE.

As technology for providing information about the DTE of a vehicle, a method of estimating the DTE using the relationship between the remaining energy of a battery and energy efficiency (efficiency of use of electricity) is known. For example, U.S. Pat. No. 9,037,327 (Patent Document 1) discloses a known method of calculating a DTE by determining energy efficiency (efficiency of use of electricity) using information accumulated from the past and multiplying the determined energy efficiency by the current remaining energy of a battery.

In addition, U.S. Pat. No. 9,574,889 (Patent Document 2) discloses a known method of providing a DTE, in which a final DTE is determined by combining a value obtained by applying a weighted factor to a DTE calculated using past energy efficiency and a value obtained by applying a weighted factor to a DTE calculated using a currently designated route. The determined final DTE is updated when an event occurs. The disclosed method in Patent Document 2 is a method of determining and updating a DTE using information accumulated from the past and information about an event ahead of a vehicle.

In Patent Document 1, a DTE is determined using past energy efficiency in order to resolve uncertainty in predicted future driving information. However, this is applicable on the assumption that the past energy efficiency will be maintained in the future. If future traffic conditions differ from past travel information, a large error may occur in energy efficiency calculated based on the past travel information.

In Patent Document 2, a DTE is updated whenever an event that consumes energy occurs. However, this may result in over-representation or under-representation of the influence of a corresponding event on a remaining travel route on the DTE.

Various other methods of estimating and predicting a DTE are known. Vehicle manufacturers use their own methods to estimate a DTE and provide the estimated DTE to a driver by displaying the same through an instrument cluster.

However, DTE prediction accuracy is not high. Thus, many consumers have complaints about DTE prediction quality. As conventional technology for resolving such complaints, a method of providing a minimum (MIN) DTE and a maximum (MAX) DTE as well as a current DTE through an instrument cluster is known.

However, this conventional technology has a problem in that the minimum DTE and the maximum DTE calculated based on a result of learning recent driving conditions greatly vary in a state in which it is impossible to predict conditions under which a driver will drive a vehicle in the future. Thus, it is difficult to accurately predict a DTE.

The above information disclosed in this Background section is only to enhance understanding of the background of the disclosure. Therefore, the Background section may contain information that does not form the related art that is already known to a person of ordinary skill in the art.

SUMMARY

The present disclosure has been made in an effort to solve the above-described problems associated with the related art. Objects of the present disclosure are to provide an apparatus and a method for displaying not only information about a current real-time distance to empty (DTE) but also information about a low DTE and a high DTE calculated irrespective of learning, by which a vehicle is capable of typically traveling depending on a driving condition such as a region or a road.

In addition, other objects of the present disclosure are to provide a DTE display apparatus and a method capable of inducing a driver to drive economically.

The objects of the present disclosure are not limited to the objects mentioned above. Other objects not mentioned herein may be more clearly understood by those of ordinary skill in the art to which the present disclosure pertains (hereinafter referred to as "persons of ordinary skill") from the following description.

In one aspect, the present disclosure provides an apparatus for providing information on a distance to empty (DTE) of a vehicle. The apparatus includes a display device configured to display DTE information of a vehicle and a controller configured to control operation of the display device. The controller determines average fuel efficiency based on a travel distance of the vehicle and the cumulative amount of electrical power consumption after the start of one driving cycle by vehicle key-on. The controller also determines short fuel efficiency by averaging fuel efficiencies calculated at a predetermined travel distance interval after the start of one driving cycle. The controller also determines an average fuel efficiency application ratio corresponding to vehicle driving information after the start of one driving cycle using setting information. The controller also determines a guide DTE value reflecting the average fuel efficiency and the short fuel efficiency according to the average fuel efficiency application ratio and controls operation of the display device to display the guide DTE value.

In another aspect, the present disclosure provides a method of providing information on a distance to empty (DTE) of a vehicle. The method includes determining, by a controller, average fuel efficiency based on a travel distance of a vehicle and the cumulative amount of electrical power consumption after start of one driving cycle by vehicle key-on. The method also includes determining, by the controller, short fuel efficiency by averaging fuel efficiencies calculated at a predetermined travel distance interval after the start of one driving cycle. The method also includes determining, by the controller, an average fuel efficiency application ratio corresponding to vehicle driving information after the start of one driving cycle using setting information. The method also includes determining, by the controller, a guide DTE value reflecting the average fuel efficiency and the short fuel efficiency according to the average fuel efficiency application ratio and controlling, by the controller, operation of a display device to display the guide DTE value.

Other aspects and embodiments of the disclosure are discussed below.

It should be understood that the terms "vehicle" or "vehicular" or other similar terms as used herein are inclusive of motor vehicles in general. Such motor vehicles may encompass passenger automobiles including sport utility vehicles (SUV), buses, trucks, various commercial vehicles, watercraft including a variety of boats and ships, aircraft, and the like. Such motor vehicles may also include hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example a vehicle that is both gasoline-powered and electric-powered.

The above and other features of the disclosure are discussed below.

BRIEF DESCRIPTION OF THE DRAWINGS

The above and other features of the present disclosure are described in detail with reference to certain embodiments thereof illustrated in the accompanying drawings, which are given hereinbelow by way of illustration only and thus are not limitative of the present disclosure, and wherein:

FIGS. 6A, 6B, and 6C are diagrams showing a method of displaying a current DTE and a certified DTE in the present disclosure;

FIGS. 7A, 7B, and 7C are diagrams showing a method of displaying a guide DTE in the present disclosure.

Figure 1:
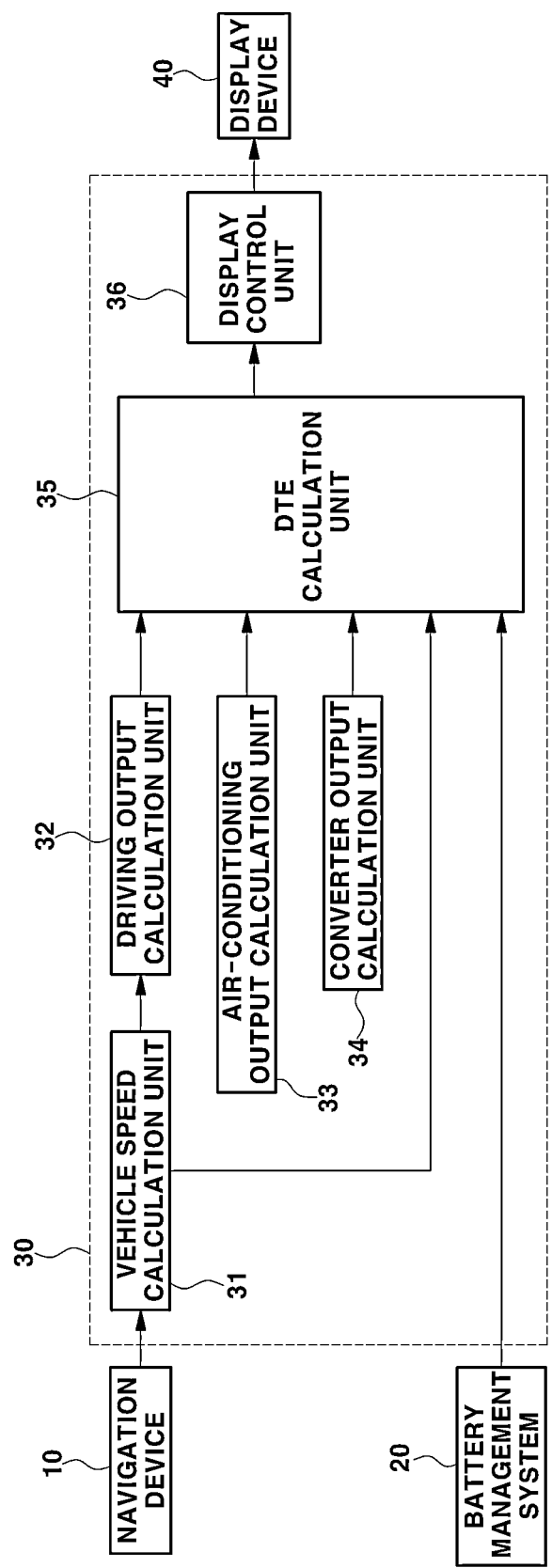
FIG. 1 is a diagram showing the configuration of an apparatus that performs a DTE information providing process according to the present disclosure.

It should be understood that the appended drawings are not necessarily drawn to scale, presenting a somewhat simplified representation of various features illustrative of the basic principles of the disclosure. The specific design features of the present disclosure as disclosed herein, including, for example, specific dimensions, orientations, locations, and shapes, will be determined in part by the particular intended application and use environment.

In the figures, the same reference numbers refer to the same or equivalent parts of the present disclosure throughout the several figures of the drawing.

DETAILED DESCRIPTION

Various embodiments are described more fully herein with reference to the accompanying drawings, in which only some embodiments are shown. Specific structural and functional details disclosed herein are merely representative for the purpose of describing embodiments. The technical concepts of the present disclosure, however, may be embodied in many alternate forms, and should not be construed as being limited only to the embodiments set forth herein. Accordingly, while embodiments of the disclosure are capable of being variously modified and taking alternative forms, embodiments thereof are shown by way of example in the drawings and are herein described in detail. It should be understood, however, that there is no intent to limit the present disclosure to the particular embodiments disclosed. On the contrary, embodiments are to cover all modifications, equivalents, and alternatives falling within the scope of the disclosure.

It should be understood that, although the terms "first", "second", and the like, may be used herein to describe various elements, these elements should not be limited by these terms. These terms are only used to distinguish one element from another. For example, a first element could be termed a second element, and, similarly, a second element could be termed a first element, without departing from the scope of the embodiments of the present disclosure.

It should be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", and the like).

Wherever possible, the same reference numbers should be used throughout the drawings to refer to the same or like parts. The terminology used herein is for the purpose of describing particular embodiments only and is not intended to be limiting of embodiments of the disclosure. As used herein, the singular forms "a", "an", and "the" are intended to include the plural forms as well, unless the context clearly indicates otherwise. It should be further understood that the terms "comprises", "comprising", "includes", and/or "including", when used herein, specify the presence of stated components, steps, operations, and/or elements. Such terms do not preclude the presence or addition of one or more other components, steps, operations, and/or elements. Also, when a component, device, element, or the like, of the present disclosure, is described as having a purpose or performing an operation, function, or the like, the component, device, or element should be considered herein as being "configured to" meet that purpose or to perform that operation or function.

The present disclosure relates to an information providing apparatus and method for providing information about a distance to empty (DTE) to a driver of an electric vehicle by displaying the information. A low DTE, a high DTE, and a certified DTE unrelated to a driver's driving pattern, a current DTE predicted by learning a long-term driver's driving pattern, and a guide DTE reflecting a driver's driving pattern and a current vehicle driving condition during one driving cycle (1DC) are provided to a driver through a display device (e.g., an instrument cluster) of a vehicle.

According to the present disclosure, the low DTE, the high DTE, and the certified DTE, which vary according to a change of the available energy (state of charge) of a battery irrespective of learning and the driver's driving pattern, and the current DTE, which varies while reflecting the long-term driver's driving pattern, are displayed together. Thus, the driver may recognize which of the low DTE, the high DTE, and the certified DTE is close to the driver's overall driving pattern.

In addition, according to the present disclosure, the guide DTE, which reflects the driver's driving pattern and the current vehicle driving condition during one driving cycle (1DC), is displayed together with the aforementioned four types of DTEs. Thus, the driver may be encouraged to drive economically during one driving cycle so that the guide DTE approaches closer to the high DTE than the certified DTE or the current DTE. The low DTE and the high DTE provided by the present disclosure are information unrelated to learning and may be values that vary depending on a change of an available battery energy irrespective of the driver's driving pattern and learning.

According to the present disclosure, not only the current DTE value but also the low DTE value and the high DTE value calculated based on the available battery energy are displayed through a display device such as an instrument cluster. Accordingly, the driver may check the low DTE value, the high DTE value, and the current DTE value located between the low DTE value and the high DTE value, which are displayed on the display device, in real-time while driving the vehicle, and may drive the vehicle so that the current DTE value approaches the high DTE value, rather than the low DTE value.

Figure 2:
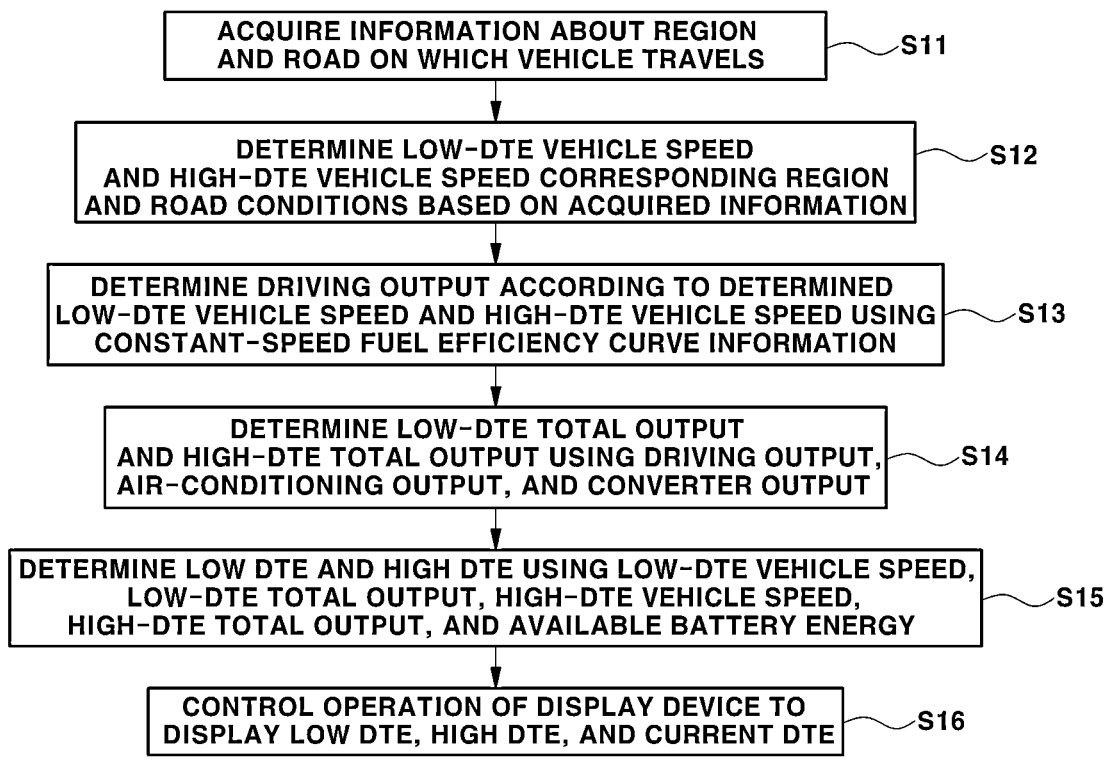
FIG. 2 is a diagram showing a method of determining a low DTE value and a high DTE value according to the present disclosure.

FIG. 1 is a diagram showing the configuration of an apparatus that performs a DTE information providing process according to the present disclosure. FIG. 2 is a diagram showing a method of determining the low DTE value and the high DTE value according to the present disclosure.

The process shown in FIG. 2 is performed by the controller 30 shown in FIG. 1. The low DTE, the high DTE, and the current DTE are calculated and obtained in real-time by the controller 30. In addition, information about the low DTE, the high DTE, and the current DTE determined by the controller 30 may be displayed on a display device 40 to be provided to the driver.

In the present disclosure, a control process for providing DTE information may be performed by a plurality of controllers that perform cooperative control while exchanging necessary information with each other or may be performed by a single integrated controller.

For example, the plurality of controllers may include a vehicle control unit (VCU), which is a high-level controller, a heating, ventilation, and air-conditioning (HVAC) controller, and a battery management system (BMS), and may further include a converter controller.

Here, the converter controller may be a converter that converts battery power and outputs the converted battery power to electronic components of the vehicle (i.e., a controller of a low-voltage direct current to direct current (DC-DC) converter (LDC)).

In the present disclosure, the plurality of controllers and the single controller having the integrated function may be collectively referred to as a controller. The control process of the present disclosure may be performed by the collectively called controller. In the following description, the "controller" is collectively called controller, unless specified otherwise.

Referring to FIG. 1, the controller 30 includes a vehicle speed calculation unit 31, a driving output calculation unit 32, an air-conditioning output calculation unit 33, a converter output calculation unit 34, a DTE calculation unit 35, and a display control unit 36. The controller 30 including the above units is the single controller having the integrated function.

Alternatively, in the case in which the control process according to the present disclosure is performed by a plurality of controllers provided in the vehicle, the air-conditioning output calculation unit 33 may be a heating, ventilating, air conditioning (HVAC) controller, which is a separate controller. The converter output calculation unit 34 may be a converter controller, which is a separate controller. Alternatively, the display control unit 36 may be a display controller, which is a separate controller connected to or included in the display device 40 in order to control operation of the display device 40.

The vehicle speed calculation unit 31, the driving output calculation unit 32, and the DTE calculation unit 35 may also be components included in a separate controller, for example, a vehicle control unit (VCU).

In this case, the air-conditioning controller, the converter controller, and the display controller, including the vehicle speed calculation unit 31, the driving output calculation unit 32, and the DTE calculation unit 35, may be collectively referred to as a controller. The control process for providing DTE information according to the present disclosure may be performed by the collectively called controller.

According to the present disclosure, the DTE calculation unit 35 of the controller 30 may determine the low DTE and the high DTE using the current available battery energy.

In more detail, the DTE calculation unit 35 of the controller 30 may calculate the low DTE using low fuel efficiency-related information and the current available battery energy. In addition, the DTE calculation unit 35 of the controller 30 may calculate the high DTE using high fuel efficiency-related information and the current available battery energy.

The low fuel efficiency-related information includes a low-DTE vehicle speed according to the current vehicle driving condition and a low-DTE total output, which is a total battery output at the low-DTE vehicle speed.

In addition, the high fuel efficiency-related information includes a high-DTE vehicle speed according to the current vehicle driving condition and a high-DTE total output, which is a total battery output at the high-DTE vehicle speed.

The DTE calculation unit 35 may calculate the low DTE using the low fuel efficiency-related information, including the low-DTE vehicle speed and the low-DTE total output, and the current available battery energy.

In addition, the DTE calculation unit 35 may calculate the high DTE using the high fuel efficiency-related information, including the high-DTE vehicle speed and the high-DTE total output, and the current available battery energy.

Here, the low-DTE total output may be a total battery output at the low-DTE vehicle speed, and the high-DTE total output may be a total battery output at the high-DTE vehicle speed.

In an embodiment of the present disclosure, the low DTE may be determined to be a value obtained by multiplying a value, obtained by dividing the low-DTE vehicle speed by the low-DTE total output, by the current available battery energy. The high DTE may be determined to be a value obtained by multiplying a value, obtained by dividing the high-DTE vehicle speed by the high-DTE total output, by the current available battery energy.

The low DTE and the high DTE may be expressed using Equations 1 and 2 below.

Low $DTE =$ [Equation 1]

(Low-$DTE$ Vehicle Speed)/(Low-$DTE$ Total Output)×

(Available Battery Energy)

High $DTE =$ [Equation 2]

(High-$DTE$ Vehicle Speed)/(High-$DTE$ Total Output)×

(Available Battery Energy)

The low-DTE vehicle speed and the high-DTE vehicle speed may be determined by the vehicle speed calculation unit 31 of the controller 30 (step S12 in FIG. 2). As the low-DTE vehicle speed and the high-DTE vehicle speed, values preset in the vehicle speed calculation unit 31 according to the vehicle driving condition may be used. In detail, the values may be preset according to a region condition and a road condition. In other words, the vehicle speed calculation unit 31 may determine the low-DTE vehicle speed and the high-DTE vehicle speed according to corresponding region and road conditions.

If the controller 30 that calculates the low DTE and the high DTE using Equations 1 and 2 is a vehicle control unit, the vehicle control unit may be used to receive real-time available battery energy information from the battery management system (BMS) 20 in order to calculate the low DTE and the high DTE.

In an embodiment of the present disclosure, the vehicle driving condition includes a region condition and a road condition in which the vehicle travels. In addition, in the present disclosure, the low-DTE vehicle speed is a vehicle speed that may provide a short DTE (low DTE) depending on a region condition and a road condition. The high-DTE vehicle speed is a vehicle speed that may provide a long DTE (high DTE) depending on a region condition and a road condition.

In an embodiment of the present disclosure, the low-DTE vehicle speed and the high-DTE vehicle speed are values preset according to a region condition and a road condition. In detail, low-DTE vehicle speeds and high-DTE vehicle speeds corresponding to respective region conditions and road conditions are input and stored in advance in the vehicle speed calculation unit 31 of the controller 30.

Accordingly, the vehicle speed calculation unit 31 of the controller 30 may determine a low-DTE vehicle speed and a high-DTE vehicle speed corresponding to a region and a road on which the vehicle is currently traveling based on information about matching between the low-DTE and high-DTE vehicle speeds and the region and road conditions.

In this case, the vehicle speed calculation unit 31 of the controller 30 may acquire information about the region and the road on which the vehicle is currently traveling from navigation information output from a navigation device 10 (step S11 in FIG. 2). Here, the navigation device 10 may be a telematics-based (e.g., Bluelink, automotive software "your voice" (UVO), and the like) navigation device.

In other words, the controller 30 may acquire information about the region condition and the road condition for determination of the low-DTE vehicle speed and the high-DTE vehicle speed from current vehicle location information and current vehicle traveling road information included in the navigation information output from the navigation device 10.

Table 1 below shows an example of setting the low-DTE vehicle speed and the high-DTE vehicle speed. The values of the low-DTE vehicle speed and the high-DTE vehicle speed are merely illustrative, and the present disclosure is not limited thereto. The low-DTE vehicle speed and the high-DTE vehicle speed may have various values depending on a region condition and a road condition.

TABLE 1

| | Korea/Europe | | North America | |
|---|---|---|---|---|
| | Low-DTE Vehicle Speed [km/hr] | High-DTE Vehicle Speed [km/hr] | Low-DTE Vehicle Speed [km/hr] | High-DTE Vehicle Speed [km/hr] |
| Highway | 120 | 80 | 130 | 90 |
| City Road | 100 | 60 | 110 | 70 |

As illustrated in Table 1, an average vehicle speed on a highway is higher than that on a city road, and an average vehicle speed in North America is higher than that in Korea or Europe. In general, the higher the average vehicle speed, the longer the DTE. Therefore, as the average vehicle speed according to a region condition and a road condition increases, the low-DTE vehicle speed and the high-DTE vehicle speed may be set to higher values.

In addition, referring to Table 1, it can be seen that, because the low-DTE vehicle speed is a vehicle speed that may provide a short DTE (low DTE), the low-DTE vehicle speed is set to a value higher than the high-DTE vehicle speed that may provide a long DTE (high DTE). When the vehicle travels at high speed, the DTE is shorter than when the vehicle travels at low speed. For this reason, the low-DTE vehicle speed that may provide a short DTE is set to a value higher than the high-DTE vehicle speed that may provide a long DTE.

In an embodiment of the present disclosure, each of the low-DTE total output and the high-DTE total output is a total battery output. Each may be determined to be a value obtained by summing, by the DTE calculation unit 35 of the controller 30, a driving output and an air-conditioning output, or may be determined to be a value obtained by summing a driving output, an air-conditioning output, and a converter output.

The driving output is a battery output used by a motor in order to drive the vehicle. The driving output is determined to be a value corresponding to the high-DTE vehicle speed or the low-DTE vehicle speed, which is an appropriate vehicle speed according to a region condition and a road condition. The output is determined by the driving output calculation unit 32 of the controller 30 (step S13 in FIG. 2) and is input to the DTE calculation unit 35.

In addition, the air-conditioning output is determined by the air-conditioning output calculation unit 33 and is input to the DTE calculation unit 35. Also, the converter output is determined by the converter output calculation unit 34 and is input to the DTE calculation unit 35.

The air-conditioning output is a battery output used for air-conditioning, and the converter output is a battery output used for electronic components. The converter output may be an output of the LDC, which converts battery power and outputs the converted battery power to the electronic components of the vehicle.

In an embodiment of the present disclosure, there is no distinction between a low DTE and a high DTE for the air-conditioning output or the LDC output, but there is a distinction between a low DTE and a high DTE for the driving output. In other words, the driving output includes a low-DTE driving output and a high-DTE driving output. The low-DTE driving output is used for the DTE calculation unit 35 to calculate the low-DTE total output. The high-DTE driving output is used for the DTE calculation unit 35 to calculate the high-DTE total output (step S14 in FIG. 2).

The driving output calculation unit 32 of the controller 30 may determine the low-DTE driving output or the high-DTE driving output using an equation having the low-DTE vehicle speed or the high-DTE vehicle speed output from the vehicle speed calculation unit 31 as an input variable. The equation may be a cubic equation as a "vehicle speed-driving output" relational expression defining a correlation between the vehicle speed and the driving output.

Equation 3 below is a cubic equation for calculating the driving output (i.e., the low-DTE driving output or the high-DTE driving output) from the low-DTE vehicle speed or the high-DTE vehicle speed.

$$\text{Driving Output} = a_1 \times (\text{Vehicle Speed}) + a_2 \times (\text{Vehicle Speed})^2 + a_3 \times (\text{Vehicle Speed})^3 \qquad [\text{Equation 3}]$$

Equation 3 above is a cubic equation representing a constant-speed fuel efficiency curve. At the vehicle development stage, constant-speed fuel efficiency tests and evaluations may be conducted on a corresponding vehicle to determine the cubic equation of "vehicle speed-driving output" and to obtain the coefficients $a_1$, $a_2$, and $a_3$ of the cubic equation.

In Equation 3, the coefficients $a_1$, $a_2$, and $a_3$, which are set information for the equation of constant-speed fuel efficiency curve, are vehicle-specific values that represent the characteristics of the vehicle specifications. The coefficients $a_1$, $a_2$, and $a_3$ may be obtained through constant-speed fuel efficiency tests and evaluations for a corresponding vehicle.

In the present disclosure, the coefficients of the constant-speed fuel efficiency curve are input and stored in advance in the driving output calculation unit 32 of the controller 30. The coefficients are used to calculate the driving output from an appropriate vehicle speed corresponding to the current region condition and road condition through the equation of constant-speed fuel efficiency curve.

In other words, the above coefficients may be used to calculate the low-DTE driving output or the high-DTE driving output from the low-DTE vehicle speed or the high-DTE vehicle speed through the equation of constant-speed fuel efficiency curve.

Equation 4 below is a cubic equation of constant-speed fuel efficiency curve for calculating the low-DTE driving output from the low-DTE vehicle speed. Equation 5 below is a cubic equation of constant-speed fuel efficiency curve for calculating the high-DTE driving output from the high-DTE vehicle speed.

$$\text{Low-}DTE \text{ Driving Output} = \qquad [\text{Equation 4}]$$
$$a_1 \times (\text{Low-}DTE \text{ Vehicle Speed}) + a_2 \times (\text{Low-}DTE \text{ Vehicle Speed})^2 + a_3 \times (\text{Low-}DTE \text{ Vehicle Speed})^3$$

$$\text{High-}DTE \text{ Driving Output} = \qquad [\text{Equation 5}]$$
$$a_1 \times (\text{High-}DTE \text{ Vehicle Speed}) + a_2 \times (\text{High-}DTE \text{ Vehicle Speed})^2 + a_3 \times (\text{High-}DTE \text{ Vehicle Speed})^3$$

As described above, the DTE calculation unit 35 of the controller 30 may determine each of the low-DTE total output and the high-DTE total output, which means the total battery output is a sum of the driving output input thereto from the driving output calculation unit 32 and the air-conditioning output input thereto from the air-conditioning output calculation unit 33. In this case, calculation of the air-conditioning output by the air-conditioning output calculation unit 33 may be performed through a well-known air-conditioning output calculation process using an air-conditioning thermal model.

Accordingly, the DTE calculation unit 35 of the controller 30 may determine the low-DTE total output to be a sum of the low-DTE driving output and the air-conditioning output and may determine the high-DTE total output to be a sum of the high-DTE driving output and the air-conditioning output (step S14 in FIG. 2).

Alternatively, the converter output, which means the battery output for the electronic components of the vehicle, may be further used to determine the total output. As described above, the converter output that is output from the converter output calculation unit 34 may be the LDC output.

Accordingly, the DTE calculation unit 35 of the controller 30 may determine the low-DTE total output to be a sum of the low-DTE driving output, the air-conditioning output, and the LDC output, and may determine the high-DTE total output to be a sum of the high-DTE driving output, the air-conditioning output, and the LDC output (step S14 in FIG. 2).

In an embodiment of the present disclosure, a learning value may be used as the LDC output, and a new LDC output value is stored in the converter output calculation unit 34 of the controller 30 at an interval of 1 km in order to learn the driver's driving pattern.

In detail, the converter output calculation unit 34 of the controller 30 has "n" buffers, and the LDC output value is stored in one of the "n" buffers (e.g., n=25) at an interval of 1 km. In this case, one of the values stored in the "n" buffers is updated to a new LDC output value at an interval of 1 km.

In addition, among the "n" values stored in the "n" buffers, the LDC output values recently stored in "m" buffers (e.g., m=10) may be averaged, and the average value may be used as a final LDC output value.

Table 2 below shows an example of calculating the LDC output values.

TABLE 2

| Buffer No. | 1 | 2 | ... | 16 | 17 | 18 | 19 | 20 | 21 | 22 | 23 | 24 | 25 |
|---|---|---|---|---|---|---|---|---|---|---|---|---|---|
| LDC Output [kW] | 0.70 | 0.71 | ... | 0.67 | 0.68 | 1.01 | 1.03 | 1.02 | 0.52 | 0.51 | 0.53 | 0.51 | 0.46 |

In the example shown in Table 2, an LDC output value, which is updated every predetermined distance (e.g., 1 km), is stored in each of a total of 25 buffers. Among the total of 25 LDC output values sequentially stored in the buffers, the LDC output values recently stored in 10 buffers are averaged, and the average value is used as a final LDC output value.

In the example shown in Table 2, the average value of the LDC output values stored in the 16$^{th}$ to 25$^{th}$ buffers is 0.70 KW. This average value is determined to be a final LDC output value.

In this way, the LDC output may be learned. However, since the LDC output is smaller than the driving output and the air-conditioning output and a fluctuation range of the LDC output is also relatively small, a fixed value, rather than a learning value, may be used as the LDC output value. In other words, a value preset for a corresponding vehicle may be used as the LDC output value.

After the low-DTE total output and the high-DTE total output are obtained through the above-described process by the DTE calculation unit 35 of the controller 30, the low DTE value and the high DTE value may be obtained through Equations 1 and 2 using the low-DTE and high-DTE total outputs, the low-DTE and high-DTE vehicle speeds output from the vehicle speed calculation unit 31, and the available battery energy output from the battery management system 20 (step S15 in FIG. 2).

Table 3 below shows an example in which the low DTE and the high DTE of a certain vehicle are obtained according to a region condition and a road condition.

TABLE 3

| | Korea/Europe | | | | North America | | | |
|---|---|---|---|---|---|---|---|---|
| | Low-DTE Vehicle Speed | Low DTE | High-DTE Vehicle Speed | High DTE | Low-DTE Vehicle Speed | Low DTE | High-DTE Vehicle Speed | High DTE |
| Highway | 120 | 274 | 80 | 415 | 130 | 244 | 90 | 379 |
| City Road | 100 | 343 | 60 | 466 | 110 | 307 | 70 | 445 |

When the values of the low DTE and the high DTE are determined, the display control unit 36 of the controller 30 controls operation of the display device 40 to display the low DTE value, the high DTE value, and the current DTE value on the display device 40 in a predetermined manner (step S16 in FIG. 2).

The current DTE is calculated by taking into consideration the driver's driving pattern and the current vehicle driving state. The current DTE may be calculated through a well-known method.

There are various methods of calculating the current DTE in real-time during travel of a vehicle using the driver's driving pattern related to acceleration and deceleration and real-time vehicle driving state information, such as a road state (e.g., an uphill road or a downhill road) or a current vehicle speed, and one of the well-known methods may be used.

Since various methods of calculating a current DTE in real-time are known to those of ordinary skill in the art to which the present disclosure pertains, a detailed description of the method of calculating the current DTE has been omitted in this specification.

The display control unit 36 of the controller 30 controls operation of the display device 40 to display the current DTE value determined in this way together with the low DTE value and the high DTE value. Accordingly, the current DTE value, the low DTE value, and the high DTE value may be provided to the driver through the display device 40.

As described above, not only the low DTE and the high DTE but also the current DTE reflecting the driver's driving pattern and the current vehicle driving state is displayed in real-time through the display device 40 such as an instrument cluster to be provided to the driver, thereby inducing the driver to drive economically so that the current DTE moves to and converges on the high DTE.

The controller 30 calculates a certified DTE using certified fuel efficiency and displays the calculated certified DTE on the display device 40 together with the low DTE, the high DTE, and the current DTE.

In this case, the DTE calculation unit 35 of the controller 30 (or the vehicle control unit (VCU)) may calculate the certified DTE by multiplying the certified fuel efficiency of the vehicle input in advance therein by the available battery energy provided from the battery management system (BMS). Subsequently, the DTE calculation unit 35 controls operation of the display device 40 through the display control unit 36 to display the calculated certified DTE.

In addition, the DTE calculation unit 35 of the controller 30 calculates a guide DTE by blending average fuel efficiency after the start of one driving cycle (1DC) and short fuel efficiency according to vehicle driving information after the start of one driving cycle.

In this case, cumulative average fuel efficiency, after the start of one driving cycle and short fuel efficiency, which is fuel efficiency information during recent travel of the vehicle, are blended according to a cumulative travel distance, which is vehicle driving information after the start of one driving cycle, and the state of charge (SOC) of the battery in order to calculate guide fuel efficiency. The calculated guide fuel efficiency is multiplied by the available battery energy in order to calculate the guide DTE.

To this end, the DTE calculation unit 35 of the controller 30 integrates the travel distance (km) after vehicle key-on using wheel speed, vehicle speed, or motor speed (RPM) information.

In addition, the DTE calculation unit 35 of the controller 30 integrates electrical power consumption (W), which is obtained by multiplying battery voltage by battery current after vehicle key-on (after the start of one driving cycle), to calculate the amount of electrical power consumption (kWh). In this case, when it is determined that the vehicle is in a stopped state based on the wheel speed, the vehicle speed, or the motor speed, calculation of the amount of electrical power consumption is stopped. Integration is performed only during travel of the vehicle.

Subsequently, the cumulative travel distance (km) after vehicle key-on is divided by the cumulative amount of electrical power consumption (kWh) during travel after vehicle key-on in order to calculate average fuel efficiency (km/kWh). The average fuel efficiency is continuously calculated in real-time during one driving cycle. However, values used to calculate the guide DTE are updated once at a predetermined time interval (e.g., 10 seconds).

The short fuel efficiency is a value obtained by averaging section fuel efficiencies calculated at an interval of a predetermined travel distance (e.g., 500 m) after vehicle key-on. For example, during travel of the vehicle, fuel efficiencies in 500 m sections are sequentially stored in respective buffers of the controller 30 and are updated at an interval of 500 m. An average value of the fuel efficiencies in 500 m sections stored in 100 buffers may be used as the short fuel efficiency. Here, the fuel efficiency update interval (e.g., 500 m) and the number of buffers (e.g., 100) are merely illustrative, and are variable values.

Here, the section fuel efficiency calculated in each travel section may be, for example, average fuel efficiency in a 500 m section that is obtained by dividing the travel distance of 500 m by the cumulative amount of electrical power consumption during 500 m travel.

Figure 3:
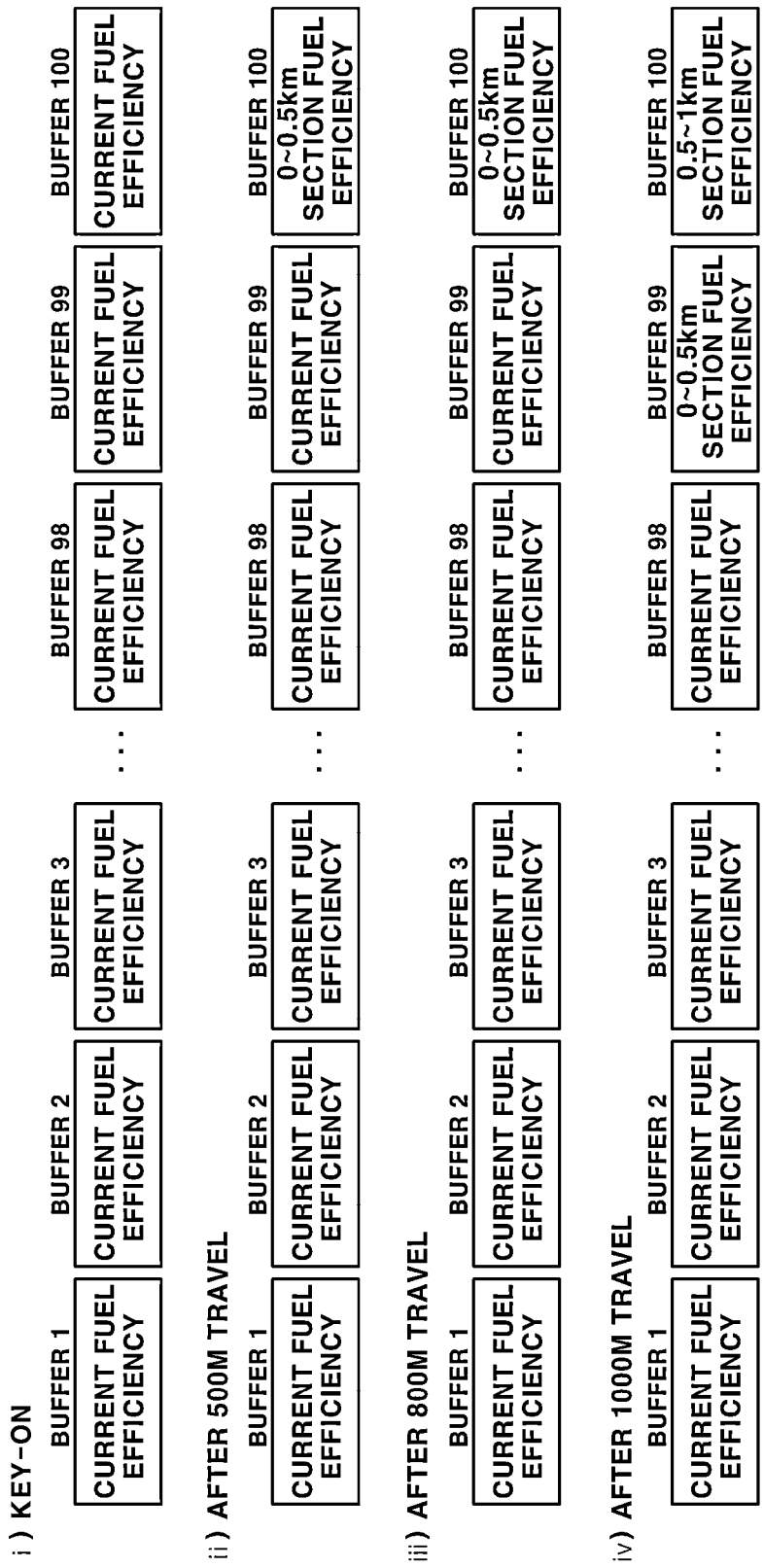
FIG. 3 is a diagram for explaining a method of calculating short fuel efficiency according to the present disclosure.

FIG. 3 is a diagram for explaining a method of calculating the short fuel efficiency. When the vehicle passes through every section of a predetermined distance, the fuel efficiency stored in each buffer is updated to new fuel efficiency calculated in an immediately previous section.

As illustrated, it is assumed that the size of one buffer corresponds to a travel distance of 500 m and a total of 100 buffers is present. At the time of vehicle key-on, fuel efficiency used to calculate the current DTE (current fuel efficiency) is input to and stored in all of the buffers.

After vehicle key-on, when the vehicle passes through every 500 m section, the fuel efficiency stored in each buffer is updated to fuel efficiency calculated in an immediately previous 500 m section. Subsequently, at every update, the fuel efficiencies stored in the 100 buffers are averaged to calculate the short fuel efficiency.

Figure 4:
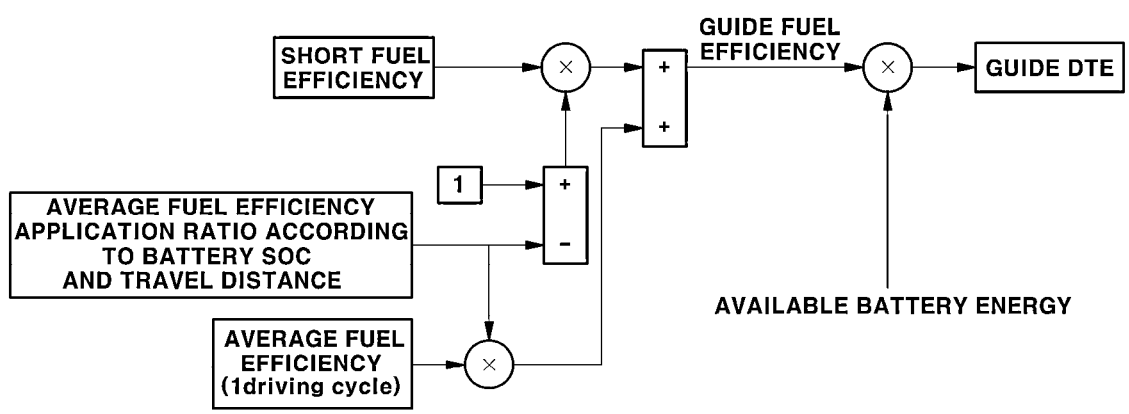
FIG. 4 is a diagram showing guide DTE calculation logic according to the present disclosure.

FIG. 4 is a diagram showing guide DTE calculation logic. As illustrated, the average fuel efficiency during one driving cycle (1DC) and the short fuel efficiency are blended according to the SOC of the battery and the travel distance during one driving cycle ("1DC travel distance") to calculate the guide fuel efficiency. In addition, the calculated guide fuel efficiency is multiplied by the available battery energy to calculate the guide DTE.

In the present disclosure, the blending ratio between the average fuel efficiency and the short fuel efficiency for calculating the guide fuel efficiency may be determined depending on the SOC of the battery and the travel distance using setting information in the form of a map or table, as shown in Table 4 below.

TABLE 4

| Average Fuel Efficiency Application Ratio [%] | | Battery SOC [%] | | | | | | | | | | |
|---|---|---|---|---|---|---|---|---|---|---|---|---|
| | | 0 | 10 | 20 | 30 | 40 | 50 | 60 | 70 | 80 | 90 | 100 |
| 1DC Travel Distance [km] | 0 | 0 | 0 | 0 | 0 | 0 | 0 | 0 | 0 | 0 | 0 | 0 |
| | 10 | 0 | 0.1 | 0.1 | 0.1 | 0.1 | 0.1 | 0.1 | 0.1 | 0.1 | 0.1 | 0.1 |
| | 20 | 0 | 0.2 | 0.2 | 0.2 | 0.2 | 0.2 | 0.2 | 0.2 | 0.2 | 0.2 | 0.2 |
| | 30 | 0 | 0.2 | 0.4 | 0.4 | 0.4 | 0.4 | 0.4 | 0.4 | 0.4 | 0.4 | 0.4 |
| | 40 | 0 | 0.2 | 0.4 | 0.6 | 0.6 | 0.6 | 0.6 | 0.6 | 0.6 | 0.6 | 0.6 |
| | 50 | 0 | 0.2 | 0.4 | 0.6 | 0.6 | 0.8 | 0.8 | 0.8 | 0.8 | 0.8 | 0.8 |
| | 100 | 0 | 0.2 | 0.4 | 0.6 | 0.6 | 0.8 | 0.9 | 0.9 | 0.9 | 0.9 | 0.9 |
| | 800 | 0 | 0.2 | 0.4 | 0.6 | 0.6 | 0.8 | 0.9 | 0.9 | 0.9 | 0.9 | 0.9 |

In the present disclosure, the blending ratio between the average fuel efficiency and the short fuel economy may be defined as the average fuel efficiency application ratio (%). In the setting information in Table 4, the average fuel efficiency application ratio is set to a predetermined value depending on the SOC of the battery and the travel distance. Here, the travel distance is a distance by which the vehicle travels after the start of one driving cycle (1DC) (i.e., the cumulative travel distance after vehicle key-on).

Referring to Table 4, the average fuel efficiency application ratio is set to a value equal to or greater than 0 and less than 1 depending on the SOC of the battery and the travel distance ("1DC travel distance") and may be expressed in percent (%) by multiplying the value by 100. The average fuel efficiency application ratio may be set to a value between 0% and 100%.

A value obtained by subtracting the average fuel efficiency application ratio obtained through the setting information in Table 4 from 1 may become a short fuel efficiency application ratio, and the short fuel efficiency application ratio may be expressed in percent (%) by multiplying the value by 100. The short fuel efficiency application ratio may be set to a value between 0% and 100%.

As shown in FIG. 4, the guide fuel efficiency may be obtained by summing a value obtained by multiplying the average fuel efficiency during one driving cycle by the average fuel efficiency application ratio corresponding to the SOC of the battery and the travel distance and a value obtained by multiplying the short fuel efficiency during one driving cycle by the short fuel efficiency application ratio (=1−average fuel efficiency application ratio (or 100%−average fuel efficiency application ratio (%))). The guide DTE may be obtained by multiplying the guide fuel efficiency by the available battery energy.

In this way, the guide fuel efficiency may be obtained by blending the average fuel efficiency during one driving cycle and the short fuel efficiency according to the SOC of the battery and the travel distance. The guide DTE may be obtained by multiplying the calculated guide fuel efficiency by the available battery energy.

In an embodiment of the present disclosure, at the time of vehicle key-on, the guide DTE and the current DTE have the same value. To this end, referring to the setting information in Table 4, when the travel distance is 0 km, all the average fuel efficiency application ratios in the entire SOC area may be set to 0 (0%) irrespective of the SOC of the battery. In this case, the short fuel efficiency application ratio may be set to 1 (100%).

Because a fluctuation range of the average fuel efficiency is very large at the beginning of travel, the driver may be confused. In order to prevent driver confusion, under the same SOC condition in the entire SOC area, when the travel distance is relatively short, the average fuel efficiency application ratio may be set to a relatively small value, and the short fuel efficiency application ratio may be set to a relatively large value. Accordingly, the fluctuation of the guide DTE may be stabilized.

In other words, under the same SOC condition in the entire SOC area, as the travel distance increases, the average fuel efficiency application ratio may be set to a larger value. Accordingly, after the average fuel efficiency is stabilized, the average fuel efficiency is mainly used to calculate the guide DTE.

In addition, in the case in which the travel distance after the start of one driving cycle is very long (e.g., greater than or equal to 200 km), the accumulated amount of average fuel efficiency data is large. Thus, the average fuel efficiency application ratio may be set under each SOC condition such that there is no or little change even when the travel distance changes and the fluctuation of the recent fuel efficiency is large.

For example, in the case in which the driver drives 200 km at high speed on a highway at a fuel efficiency of 4 km/kWh and then 10 km at low speed on a city road at a fuel efficiency of 8 km/kWh, the average fuel efficiency may increase very gently because the influence of the fuel efficiency accumulated during 200 km travel at high speed is large.

In particular, when the SOC of the battery is low, it is necessary to determine whether to charge the battery. In this case, the recent fuel efficiency is more important than the cumulative fuel efficiency. Therefore, under the same 1DC travel distance condition, as the SOC of the battery decreases, the average fuel efficiency application ratio may be set to a smaller value. Accordingly, the short fuel efficiency application ratio may increase, and the influence of recent travel on calculation of the guide DTE may increase.

In this way, the DTE calculation unit 35 of the controller 30 may determine the guide DTE and may perform cooperative control with the display control unit 36. Thus, the guide DTE calculated as described above is also displayed on the display device 40 together with the low DTE, the high DTE, the current DTE, and the certified DTE.

Figure 5:
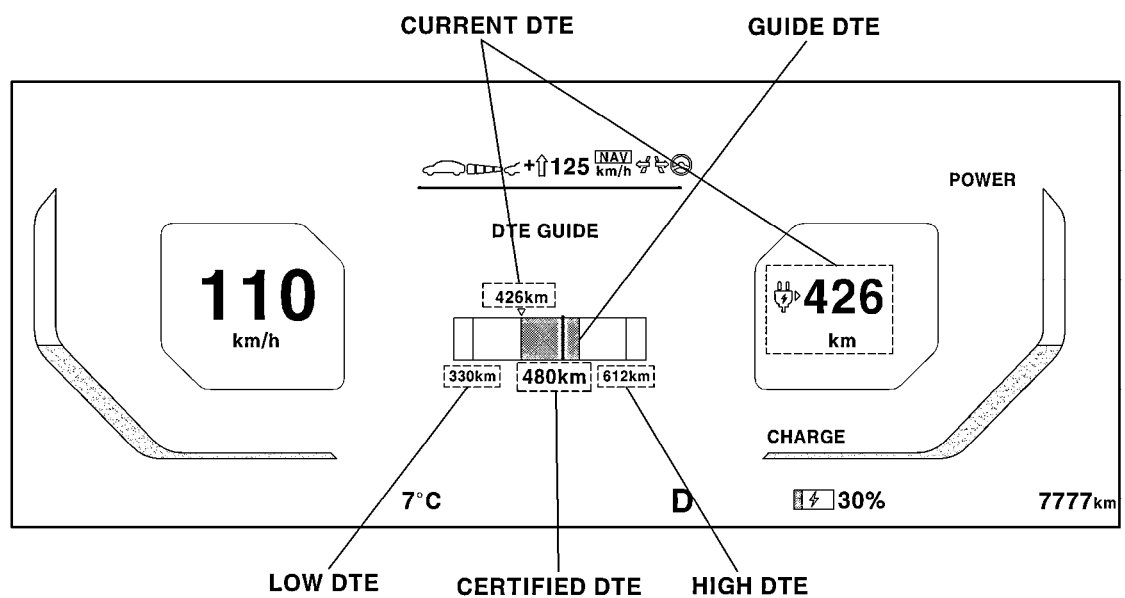
FIG. 5 is a diagram showing an example in which DTE information is displayed on a display device in the present disclosure.

FIG. 5 is a diagram showing an example in which DTE information is displayed on the display device in the present disclosure. As illustrated, the low DTE, the high DTE, the current DTE, the certified DTE, and the guide DTE, which are DTE information, may be displayed on the instrument cluster together with information typically displayed on the instrument cluster.

In this case, the DTE information may be displayed in a prescribed form at a prescribed position on the screen of the display device. In the example shown in FIG. 5, the low DTE, the high DTE, the current DTE, the certified DTE, and the guide DTE are displayed together on a segment of the screen that is indicated by "DTE GUIDE".

Each DTE value may be displayed as a numerical value on the display device 40, and the magnitude of each DTE value may be expressed using a graphic image along with the numerical value. Since each DTE value displayed on the display device 40 varies in real-time depending on the current available battery energy, the numerical value or the position, color, shape, or size of the graphic image indicating the magnitude of each DTE value varies depending on the current DTE value that is calculated in real-time.

In the example shown in FIG. 5, in addition to the numerical values indicating the low DTE, the high DTE, the certified DTE, and the current DTE, indicating lines indicating the low DTE and the high DTE are displayed in a line or bar shape elongated in a vertical direction at prescribed positions in a rectangular display region elongated in a horizontal direction. In this case, the indicating lines are displayed in a shape crossing the display region vertically.

The indicating lines indicating the low DTE and the high DTE may be fixed at prescribed positions in the display region. The indicating line indicating the low DTE (hereinafter referred to as a "low DTE indicating line") may be displayed near the left end of the display region, and the indicating line indicating the high DTE (hereinafter referred to as a "high DTE indicating line") may be displayed near the right end of the display region.

Similarly, the indicating line indicating the current DTE (hereinafter referred to as a "current DTE indicating line") and the indicating line indicating the certified DTE (hereinafter referred to as a "certified DTE indicating line") may also be displayed in a line or bar shape elongated in the vertical direction in the display region. In this case, the current DTE indicating line and the certified DTE indicating line may be displayed in a shape crossing the display region vertically.

In addition, since the values of the low DTE, the high DTE, the certified DTE, and the current DTE vary in real-time, the numerical values indicating the DTE values may be displayed so as to change in real-time. However, as described above, the low DTE indicating line and the high DTE indicating line may be fixed at prescribed positions in the display region (positions near the left end and right end of the display region).

On the other hand, because most drivers want to check the current DTE value and the certified DTE value, the magnitudes thereof may be indicated by the positions of the indicating lines corresponding thereto in the display region. In this case, the positions of the current DTE indicating line and the certified DTE indicating line may move left or right in the display region according to changes of the DTE values corresponding thereto. In addition, the current DTE indicating line and the certified DTE indicating line may be displayed between the low DTE indicating line and the high DTE indicating line, the positions of which are fixed in the display region.

Accordingly, the position of the current DTE indicating line and the position of the certified DTE indicating line, which move between the low DTE indicating line and the high DTE indicating line in the display region, correspond to the current DTE value and the certified DTE value.

In addition, the magnitudes of the current DTE value and the certified DTE value relative to the low DTE value and the high DTE value may be indicated by the display positions of the current DTE indicating line and the certified DTE indicating line relative to the positions of the low DTE indicating line and the high DTE indicating line in the display region between the low DTE indicating line and the high DTE indicating line. The positions of the current DTE indicating line and the certified DTE indicating line indicate the magnitudes of the current DTE value and the certified DTE value relative to the low DTE value and the high DTE value.

Accordingly, when the current DTE value and the certified DTE value change, the current DTE indicating line and the certified DTE indicating line move left or right to positions corresponding to the current DTE value and the certified DTE value between the low DTE indicating line and the high DTE indicating line, the positions of which are fixed in the display region.

In other words, in the case, the high DTE value is larger than the low DTE value and the position of the low DTE indicating line is set to a position near the left end of the display region and the position of the high DTE indicating line is set to a position near the right end of the display region. As the magnitudes of the current DTE value and the certified DTE value increase, the positions of the current DTE indicating line and the certified DTE indicating line may move right in the display region between the low DTE indicating line and the high DTE indicating line.

Conversely, as the magnitudes of the current DTE value and the certified DTE value decrease, the positions of the current DTE indicating line and the certified DTE indicating line may move left in the display region between the low DTE indicating line and the high DTE indicating line.

In this way, when the current DTE value and the certified DTE value change, the positions of the current DTE indicating line and the certified DTE indicating line move left or right in conjunction with the changes of the DTE values corresponding thereto. The moved positions of the indicating lines indicate the magnitudes of the current DTE value and the certified DTE value relative to the low DTE value and the high DTE value.

Although an embodiment of the present disclosure has been described as being configured such that the display region has a shape extending horizontally and the indicating line displayed so as to indicate a corresponding DTE value has a line or bar shape extending vertically so as to cross the display region, an embodiment is not limited thereto. In another embodiment, the display region may have a shape extending vertically, and the indicating line displayed so as to indicate a corresponding DTE value may have a line or bar shape extending horizontally so as to cross the display region.

Identical to the above-described embodiment, the positions of the current DTE indicating line and the certified DTE indicating line indicate the DTE values corresponding thereto. However, in the other embodiment, the current DTE indicating line and the certified DTE indicating line move up or down in the display region according to changes of the DTE values corresponding thereto.

In an embodiment of the present disclosure, the current DTE indicating line and the certified DTE indicating line may be displayed on the display device 40 in different colors so that the driver easily recognizes the same while driving. In particular, the color of the current DTE indicating line may be changed depending on the state of the current DTE value.

In the present disclosure, the low DTE has a meaning of a general minimum DTE, and the high DTE has a meaning of a general maximum DTE. The certified DTE is a DTE calculated based on certified fuel efficiency and is used for the purpose of providing a clear reference value.

In addition, the current DTE is a learning DTE that is related to a history-based predicted all-electric range (AER) (i.e., a driving range during one driving cycle). The current DTE is used for the purpose of calculating the expected AER based on the fuel efficiency accumulated from the past.

The guide DTE is a DTE calculated based on the current fuel efficiency determined by the driver. The purpose of use of the guide DTE is to visualize the fuel efficiency level based on the driver's driving history (the fuel efficiency level according to the driver's driving pattern or the driving environment), thereby showing the correlation between DTE change and driving habit/external environment. Accordingly, the driver recognizes the degree of driver's actual DTE (guide DTE) compared to the low DTE, the high DTE, the certified DTE, and the current DTE (i.e., existing fuel efficiency based on driving history (learning)). The ultimate purpose of use of the guide DTE is to induce the driver to drive economically so that the driver's DTE approaches the high DTE.

Figure 6A:
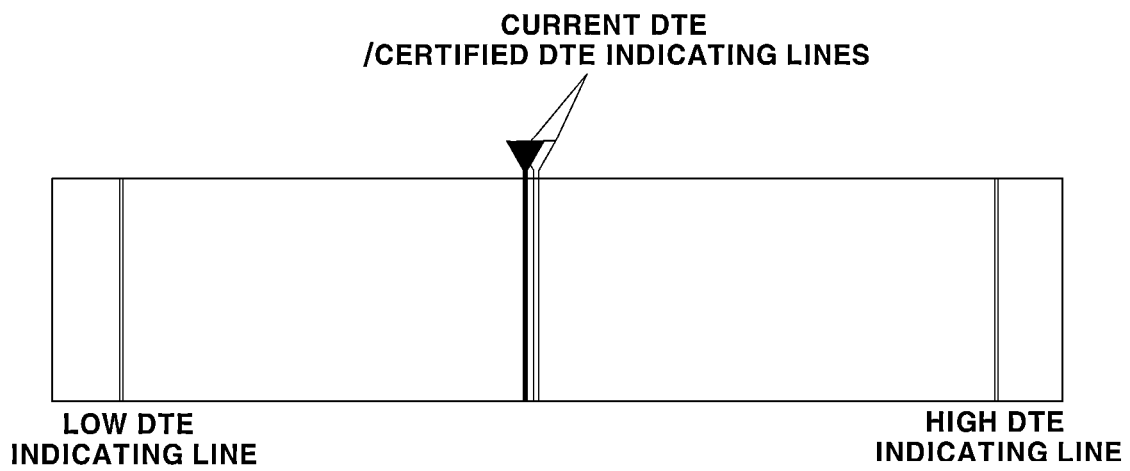
Figure 6B:
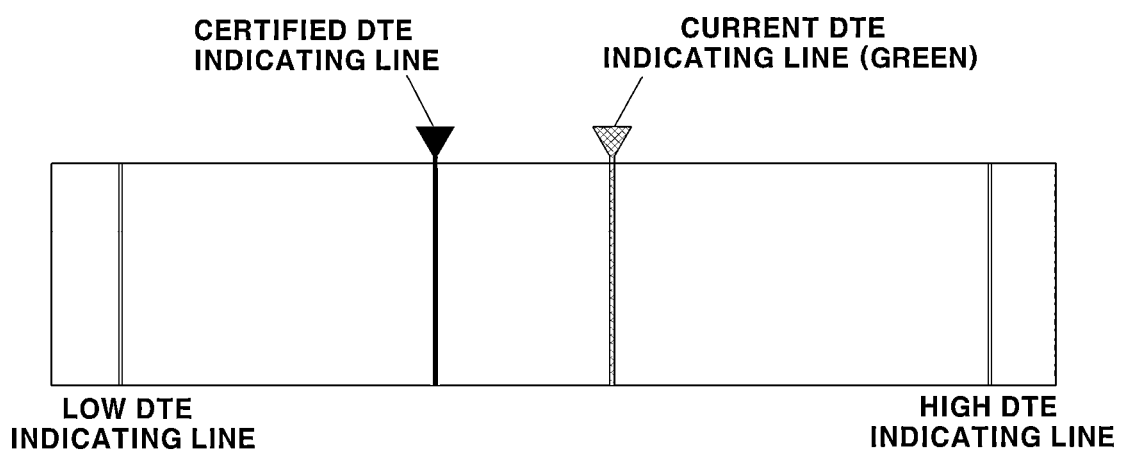

FIGS. 6A, 6B, and 6C are diagrams showing a method of displaying the current DTE and the certified DTE. FIG. 6A illustrates a state in which the current DTE and the certified DTE have similar values. Thus, the current DTE indicating line and the certified DTE indicating line are displayed at positions close to each other. If the two DTE values are identical to each other, the two indicating lines may be displayed so as to overlap each other.

In addition, FIG. 6B illustrates a case in which the current DTE value is larger than the certified DTE value. FIG. 6C illustrates a case in which the current DTE value is smaller than the certified DTE value. As described above, the current DTE indicating line and the certified DTE indicating line may be displayed on the display device 40 in different colors so that the driver easily recognizes the same while driving.

In particular, the color of the current DTE indicating line may be changed depending on the state of the current DTE value. For example, the current DTE indicating line may change between different colors (e.g., two colors) depending on the magnitude of the current DTE value relative to the certified DTE value.

For example, the certified DTE indicating line may have a predetermined color (e.g., black or yellow). In this case, as shown in FIG. 6B, when the current DTE value is larger than the certified DTE value, the current DTE indicating line may be displayed in a green-based color, which provides relaxation and positive energy. On the other hand, as shown in FIG. 6C, when the current DTE value is smaller than the certified DTE value, the current DTE indicating line may be displayed in a red-based color (e.g., orange) in order to draw the driver's attention or to alert the driver.

Accordingly, the driver may easily compare the current DTE value and the certified DTE value with the low DTE value and the high DTE value. The driver may also easily check the degree of current DTE value and certified DTE value compared to the low DTE value and the high DTE value through the display positions or colors of the indicating lines.

According to the present disclosure, the low DTE, the high DTE, the current DTE, and the certified DTE may be real-time information that is obtained based on current information and varies. The values thereof displayed during travel of the vehicle vary in real-time.

In detail, the low DTE, the high DTE, and the certified DTE are determined based on the available battery energy, and the values thereof vary depending on a change of the available battery energy irrespective of the driver's driving pattern and learning.

On the other hand, the current DTE is information that is learned, and the value thereof varies in real-time depending on the driver's driving pattern, the vehicle driving condition (e.g., driving on uphill/downhill roads), and the vehicle driving state (e.g., a driving speed of the vehicle).

The low DTE value, the high DTE value, the current DTE value, and the certified DTE value, which vary in real-time during travel of the vehicle, are displayed as graphic images through the instrument cluster of the vehicle. Thus, the driver may intuitively recognize, through the graphic images, that the real-time DTE (i.e., the current DTE value that is calculated based on the driver's driving pattern, the real-time vehicle driving condition, and the vehicle driving state) approaches the low DTE value or the high DTE value between the low DTE value and the high DTE value, which vary depending on a change of the current available battery energy. Accordingly, the driver may control the vehicle driving state so that the current DTE value approaches the high DTE value while checking the graphic images indicating the DTE values. In other words, the driver may drive the vehicle economically.

Figure 7A:
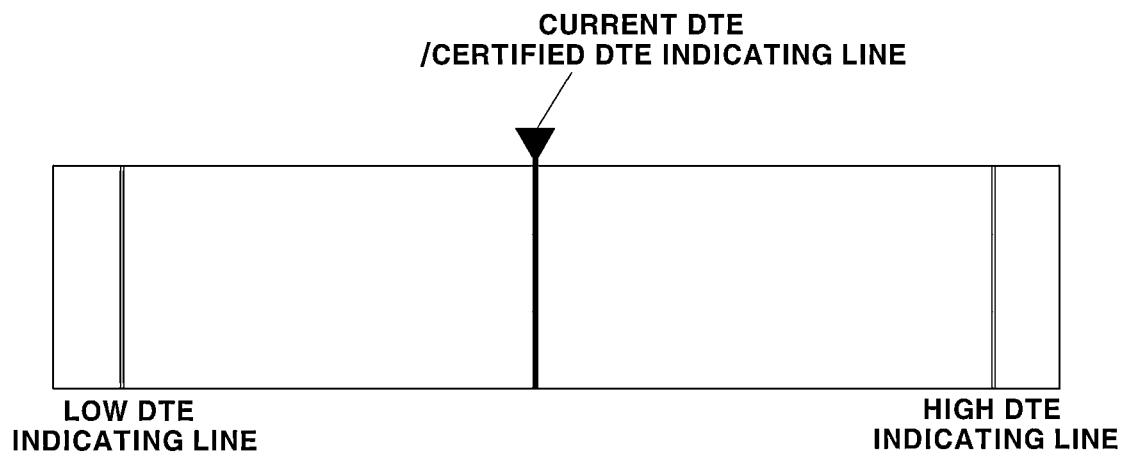
Figure 7B:
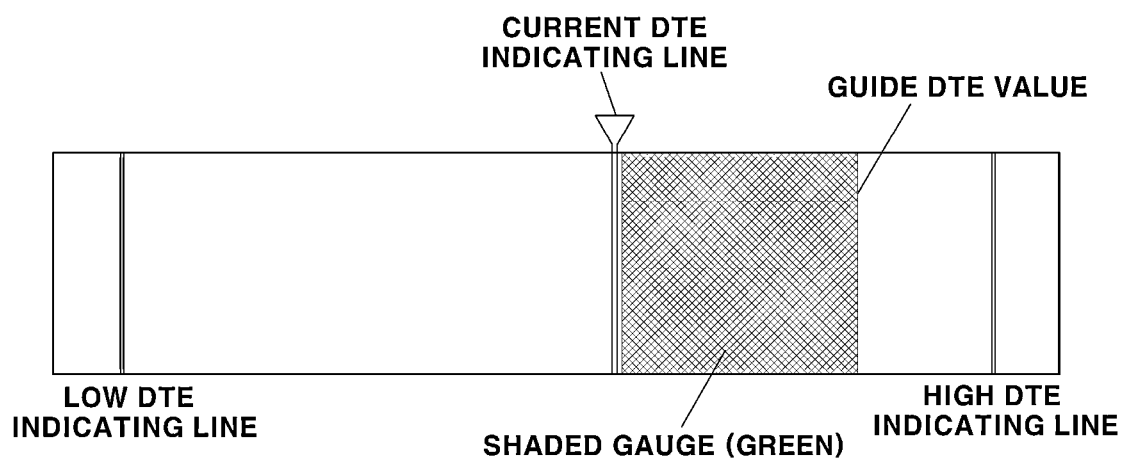

FIGS. 7A, 7B, and 7C are diagrams showing a method of displaying the guide DTE. Compared to the low DTE, the high DTE, the current DTE, and the certified DTE, the guide DTE reflects the driver's driving pattern and the current vehicle driving condition during one driving cycle. Therefore, the guide DTE is a DTE that represents the driver's current fuel efficiency.

Accordingly, the driver may visually check that the guide DTE displayed through the display device 40 approaches the high DTE, which is the most ideal DTE, and may drive economically so that the guide DTE approaches the high DTE.

According to the present disclosure, the guide DTE, which represents the current fuel efficiency in real-time while the driver is driving, is also displayed in the display region in which the values of the low DTE, the high DTE, the current DTE, and the certified DTE are displayed so that the driver easily compares the guide DTE value with the other DTE values. Accordingly, the driver may easily check the degree of his/her actual DTE (guide DTE) compared to the low DTE, the high DTE, the current DTE, and the certified DTE.

To this end, the low DTE value, the high DTE value, the current DTE value, the certified DTE value, and the guide DTE value are displayed in the display region at positions corresponding to the magnitudes of the respective DTE values. Thus, the driver compares the relative magnitudes of the DTE values by comparing the display positions of the respective DTE values.

In an embodiment of the present disclosure, the guide DTE value may be displayed as a display position or size of a graphic image indicating the guide DTE value, rather than being displayed as a separate indicating line, in the display region between the low DTE indicating line and the high DTE indicating line.

In other words, similar to the values of the current DTE and the certified DTE, the magnitude of the guide DTE value relative to the low DTE value and the high DTE value may be indicated by the display position of the graphic image indicating the guide DTE value relative to the positions of the low DTE indicating line and the high DTE indicating line in the display region between the low DTE indicating line and the high DTE indicating line.

The display position of the guide DTE value in the display region indicates the magnitude of the guide DTE value relative to the low DTE value and the high DTE value and moves left or right according to a change of the guide DTE value.

Referring to FIG. 7A, when the guide DTE value is identical to the current DTE value, the guide DTE value and the current DTE value may be displayed as one indicating line. The current DTE indicating line indicates the guide DTE value as well as the current DTE value. In this case, no separate indicating line indicating the guide DTE value is displayed.

FIG. 7B illustrates a case in which the guide DTE value is larger than the current DTE value. A region from the current DTE indicating line to the position of the guide DTE value is expressed as a shaded gauge having a prescribed color. Here, the shaded gauge may be formed such that a display region between two points, (i.e., between the position of the current DTE indicating line and the position of the guide DTE value) is filled with a prescribed color.

As illustrated, the DTE value displayed in the display region becomes smaller from right to left and becomes larger from left to right. Therefore, if the guide DTE value is larger than the current DTE value, the guide DTE value is located on the right side of the current DTE indicating line.

In this case, the shaded gauge may be displayed to the right of the current DTE indicating line. If the current DTE indicating line is located at the left end of the shaded gauge, the position of the right end of the shaded gauge, which is opposite the position of the current DTE indicating line, is the position of the guide DTE value. In other words, the shaded gauge extends rightward from the current DTE indicating line.

FIG. 7C illustrates a case in which the guide DTE value is smaller than the current DTE value. A region from the current DTE indicating line to the position of the guide DTE value is expressed as a shaded gauge having a prescribed color. In this case, the shaded gauge extends leftward from the current DTE indicating line.

Here, the shaded gauge may be formed such that a display region between two points (i.e., between the position of the current DTE indicating line and the position of the guide DTE value) is filled with a prescribed color.

As illustrated, if the guide DTE value is smaller than the current DTE value, the guide DTE value is located on the left side of the current DTE indicating line. In this case, the position of the left end of the shaded gauge, which is opposite the position of the current DTE indicating line, is the position of the guide DTE value.

In addition, the color of the shaded gauge in FIG. 7B and the color of the shaded gauge in FIG. 7C may be set to be different from each other. For example, the color of the shaded gauge in FIG. 7B may be set to a green-based color, which provides relaxation and positive energy, and the color of the shaded gauge in FIG. 7C may be set to a red-based color (e.g., orange) in order to draw the driver's attention or to alert the driver.

If the driver drives economically to improve efficiency of use of electricity (fuel efficiency), the position of the guide DTE value, which represents the current fuel efficiency, may move toward the high DTE indicating line. In this case, the guide DTE value may become larger than the current DTE value (refer to FIG. 7B).

In this case, as the driver drives more economically, the position of the guide DTE value, which represents the current fuel efficiency, may move farther away from the current DTE indicating line, and may move closer to the high DTE indicating line.

In addition, since the guide DTE value is located on the right side of the current DTE indicating line in the display region, a shaded gauge having a green-based color is displayed to the right of the current DTE indicating line in the display region so that the driver easily recognizes the magnitude of the guide DTE value (refer to FIG. 7B).

As the driver drives more economically, the guide DTE value may further increase, and the position of the guide DTE value may further move right in the display region. In this case, the area of the green shaded gauge may further increase (refer to FIG. 7B).

While checking increase in the area of the green shaded gauge, the driver may drive more economically so that the area of the green shaded gauge further increases and the position of the guide DTE value moves closer to the high DTE indicating line.

Alternatively, when the guide DTE value is smaller than the current DTE value, if the driver drives economically, the guide DTE value may increase, and the position of the guide DTE value may move close to the current DTE indicating line.

In this case, an orange shaded gauge may be displayed between the position of the guide DTE value and the current DTE indicating line in the display region (refer to FIG. 7C). As the guide DTE value increases, the area of the orange shaded gauge may decrease.

Accordingly, the driver may be encouraged to drive economically so that the area of the green shaded gauge increases or so that the area of the orange shaded gauge decreases.

Conversely, if the vehicle driving condition is poor in terms of efficiency of use of electricity (fuel efficiency), the position of the guide DTE value, which represents the current fuel efficiency, may move toward the low DTE indicating line. In this case, the guide DTE value may become smaller than the current DTE value (refer to FIG. 7C).

In this case, if the vehicle driving condition becomes poorer in terms of efficiency of use of electricity, the position of the guide DTE value, which represents the current fuel efficiency, may move farther away from the current DTE indicating line, and may move closer to the low DTE indicating line.

In addition, since the guide DTE value is located on the left side of the current DTE indicating line in the display region, an orange shaded gauge is displayed to the left of the current DTE indicating line in the display region so that the driver easily recognizes the magnitude of the guide DTE value (refer to FIG. 7C).

If the vehicle driving condition becomes poorer in terms of efficiency of use of electricity, the guide DTE value may further decrease, and the position of the guide DTE value may further move left in the display region. In this case, the area of the orange shaded gauge may further increase (refer to FIG. 7C).

While checking decrease in the area of the orange shaded gauge, the driver may drive more economically so that the area of the orange shaded gauge further decreases and so that the position of the guide DTE value does not move toward the low DTE indicating line but moves toward the high DTE indicating line.

Alternatively, when the guide DTE value is larger than the current DTE value, if the vehicle driving condition is poor in terms of efficiency of use of electricity, the guide DTE value may decrease, and the position of the guide DTE value may move close to the current DTE indicating line.

In this case, a green shaded gauge may be displayed between the position of the guide DTE value and the current DTE indicating line in the display region (refer to FIG. 7B). If the vehicle driving condition is poor in terms of efficiency of use of electricity, the guide DTE value may decrease. Thus, the area of the green shaded gauge may decrease.

Accordingly, the driver may drive economically so that the area of the green shaded gauge increases and so that the position of the guide DTE value does not move toward the low DTE indicating line but moves toward the high DTE indicating line while checking increase in the area of the green shaded gauge.

Figure 8A:
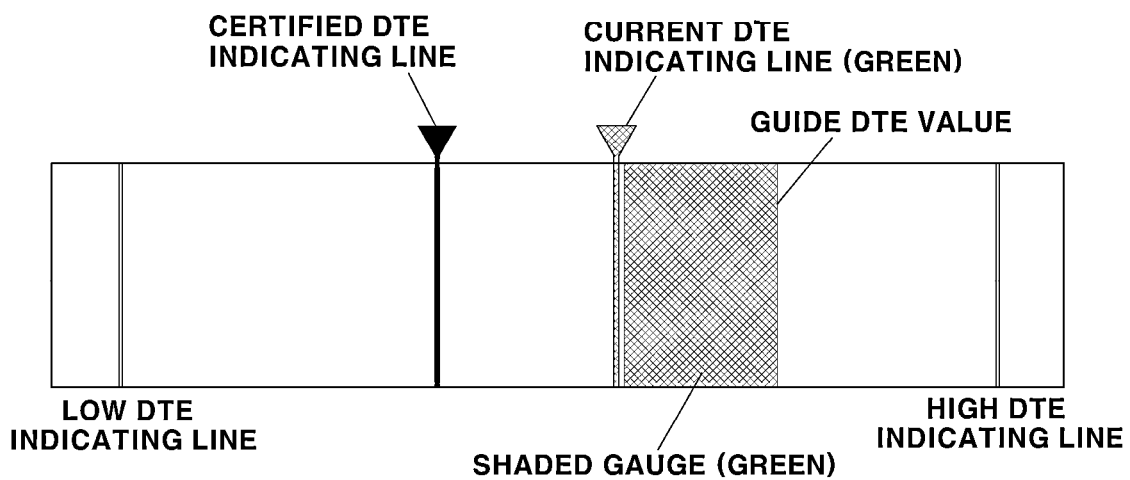
FIGS. 8A, 8B, and 8C are diagrams showing an example in which a certified DTE value is also displayed in the present disclosure.
Figure 8B:
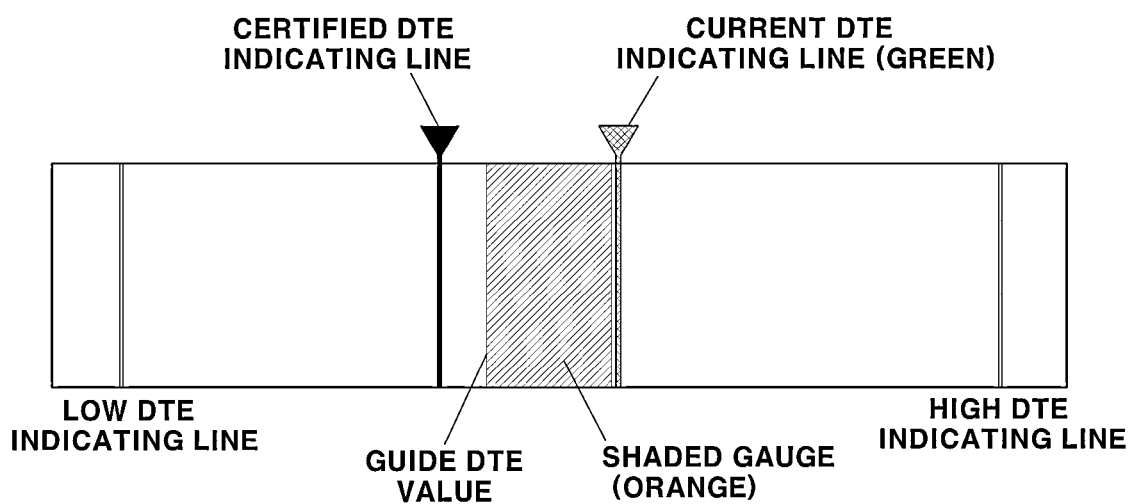
Figure 8C:
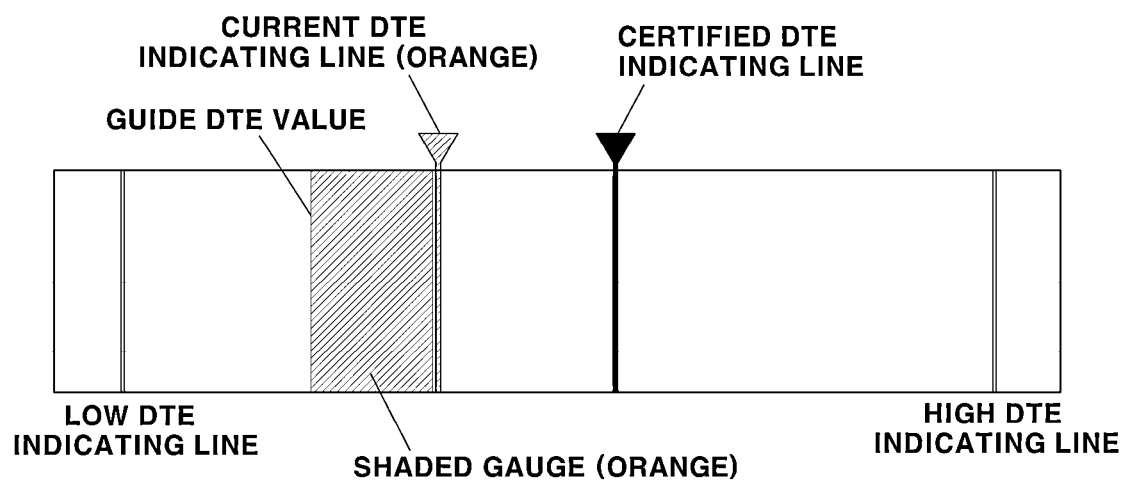

FIGS. 8A, 8B, and 8C are diagrams showing an example in which the certified DTE value is also displayed. Since the current DTE, the certified DTE, and the guide DTE are calculated in different ways, the DTE values may have the same value or different values.

As shown in FIG. 8A, when the current DTE is greater than the certified DTE and the guide DTE is greater than the current DTE, the certified DTE indicating line is located closest to the low DTE indicating line, the current DTE indicating line is located on the right side of the certified DTE indicating line, and the green shaded gauge is displayed to the right of the current DTE indicating line in the display region.

In this case, the guide DTE value is located closest to the high DTE indicating line, and the current DTE indicating line is located between the certified DTE indicating line and the position of the guide DTE value. In the example shown in FIG. 8A, since the guide DTE representing the current fuel efficiency is greater than the current DTE, the current DTE may move toward the high DTE. The driver may drive economically so that the area of the green shaded gauge increases and so that the guide DTE value approaches the high DTE value while checking the DTE display state.

As shown in FIG. 8B, when the current DTE is greater than the certified DTE and the guide DTE is less than the current DTE, the guide DTE representing the current fuel efficiency is less than the current DTE. Thus, the current DTE may move toward the low DTE. The driver may drive economically so that the area of the orange shaded gauge decreases and so that the guide DTE value approaches the high DTE value while checking the DTE display state.

As shown in FIG. 8C, when the current DTE is less than the certified DTE and the guide DTE is less than the current DTE, the guide DTE representing the current fuel efficiency is less than the current DTE. Thus, the current DTE may move toward the low DTE. The driver may drive economically so that the area of the orange shaded gauge decreases and so that the guide DTE value approaches the high DTE value while checking the DTE display state.

As is apparent from the above description, according to the apparatus and method for providing information on a DTE of a vehicle according to the present disclosure, a low DTE, a high DTE, and a certified DTE, which vary according to a change of the available energy of a battery irrespective of learning and a driver's driving pattern, and a current DTE, which varies while reflecting a long-term driver's driving pattern and a current vehicle driving state, are displayed together. Thus, a driver may recognize which of the low DTE, the high DTE, and the certified DTE is close to the driver's overall driving pattern.

In addition, a guide DTE, which reflects the driver's driving pattern and the current vehicle driving condition during one driving cycle (1DC), is displayed together with the low DTE, the high DTE, the current DTE, and the certified DTE. Thus, the driver may be encouraged to drive economically so that the guide DTE approaches closer to the high DTE than the certified DTE and the current DTE.

In addition, the fuel efficiency level based on the current driver's driving condition is visualized in a gauge form through the guide DTE. This enables the driver to recognize the driver's fuel efficiency level according to the driver's driving pattern and the driving environment.

As a result, the present disclosure shows the correlation between DTE change and driving habit/external environment change through the guide DTE. The present disclosure also enables the driver to recognize the degree of driver's actual DTE compared to the low DTE, the high DTE, the current DTE, and the certified DTE. This may induce the driver to drive economically so that the driver's DTE approaches the high DTE.

The technical concepts of the present disclosure have been described above with reference to various embodiments. The embodiments described in the specification and shown in the accompanying drawings are illustrative only and are not intended to represent all aspects of the disclosure. Therefore, the present disclosure is not limited to the disclosed embodiments, and it should be understood by those of ordinary skill in the art that various modifications or changes can be made without departing from the technical spirit or scope of the disclosure as disclosed in the appended claims.

What is claimed is:

1. An apparatus for providing information on a distance to empty (DTE) of a vehicle, the apparatus comprising:
a display device configured to display DTE information of a vehicle; and
a controller configured to
determine average fuel efficiency based on a travel distance of the vehicle and a cumulative amount of electrical power consumption after start of one driving cycle by vehicle key-on,
determine short fuel efficiency by averaging fuel efficiencies calculated at a predetermined travel distance interval after start of the one driving cycle,
determine an average fuel efficiency application ratio corresponding to vehicle driving information after start of the one driving cycle using setting information,
determine a guide DTE value reflecting the average fuel efficiency and the short fuel efficiency according to the average fuel efficiency application ratio, and
control operation of the display device to display the guide DTE value.

2. The apparatus of claim 1, wherein the vehicle driving information comprises a travel distance and a battery state of charge (SOC) after start of the one driving cycle.

3. The apparatus of claim 2, wherein, in the setting information, when the travel distance is 0 kilometers (km), the average fuel efficiency application ratio in an entire area of the battery SOC is set to 0, and wherein, as the travel distance increases under the same battery SOC condition, the average fuel efficiency application ratio is set to a larger value.

4. The apparatus of claim 2, wherein, in the setting information, as the battery SOC decreases under the same travel distance condition, the average fuel efficiency application ratio is set to a smaller value.

5. The apparatus of claim 1, wherein, in a process of determining the guide DTE value, the controller is configured to:
determine a remaining short fuel efficiency application ratio from the average fuel efficiency application ratio;
determine guide fuel efficiency to be a value obtained by summing fuel efficiency obtained by applying the average fuel efficiency application ratio to the average fuel efficiency and fuel efficiency obtained by applying the short fuel efficiency application ratio to the short fuel efficiency; and
determine the guide DTE value to be a value obtained by multiplying the guide fuel efficiency by a current available battery energy.

6. The apparatus of claim 1, wherein, in a process of determining the average fuel efficiency, the controller is configured to determine the cumulative amount of electrical power consumption by integrating electrical power consumption obtained by multiplying battery voltage by battery current only during travel of the vehicle after start of the one driving cycle.

7. The apparatus of claim 1, wherein, in a process of determining the short fuel efficiency, the controller is configured to:
sequentially store the fuel efficiencies calculated at the travel distance interval in a plurality of buffers and updates the fuel efficiencies during travel of the vehicle after start of the one driving cycle; and
determine the short fuel efficiency to be a value obtained by averaging the fuel efficiencies stored in the plurality of buffers.

8. The apparatus of claim 1, wherein the controller is configured to:
determine low fuel efficiency-related information and high fuel efficiency-related information according to a current vehicle driving condition;
determine a low DTE value and a high DTE value based on the low fuel efficiency-related information, the high fuel efficiency-related information, and a current available battery energy;
determine a current DTE value indicating a real-time DTE; and
control operation of the display device to display the low DTE value, the high DTE value, and the current DTE value together with the guide DTE value.

9. The apparatus of claim 8, wherein the controller and the display device are configured to display the guide DTE value, the low DTE value, the high DTE value, and the current DTE value through one or two or more display methods selected from among a numerical value, a display position on a graph image, a size of the graphic image, and a color of the graphic image so that the guide DTE value, the low DTE value, the high DTE value, and the current DTE value are compared with each other.

10. The apparatus of claim 9, wherein the controller and the display device are configured such that the guide DTE value, the low DTE value, the high DTE value, and the current DTE value are displayed in a display region formed as a graphic image extending horizontally or vertically and are indicated by display positions thereof determined corresponding to magnitudes thereof relative to each other.

11. The apparatus of claim 10, wherein the display positions of the low DTE value and the high DTE value are fixed to respective end portions of the display region, and wherein the display positions of the guide DTE value and the current DTE value are moved in real-time according to changes thereof between the display positions of the low DTE value and the high DTE value in order to show relative magnitudes thereof.

12. The apparatus of claim 8, wherein the controller is configured to:
determine a certified DTE value to be a value obtained by multiplying certified fuel efficiency of the vehicle by the current available battery energy; and
control operation of the display device to display the certified DTE value together with the guide DTE value, the low DTE value, the high DTE value, and the current DTE value.

13. The apparatus of claim 12, wherein the controller and the display device are configured such that the certified DTE value, the guide DTE value, the low DTE value, the high DTE value, and the current DTE value are displayed in a display region formed as a graphic image extending horizontally or vertically and are indicated by display positions thereof determined corresponding to magnitudes thereof relative to each other.

14. The apparatus of claim 13, wherein the display positions of the low DTE value and the high DTE value are fixed to respective end portions of the display region, and wherein the display positions of the certified DTE value, the guide DTE value, and the current DTE value are moved in real-time according to changes thereof between the display positions of the low DTE value and the high DTE value in order to show relative magnitudes thereof.

15. A method of providing information on a distance to empty (DTE) of a vehicle, the method comprising:
   determining, by a controller, average fuel efficiency based on a travel distance of a vehicle and a cumulative amount of electrical power consumption after start of one driving cycle by vehicle key-on;
   determining, by the controller, short fuel efficiency by averaging fuel efficiencies calculated at a predetermined travel distance interval after start of the one driving cycle;
   determining, by the controller, an average fuel efficiency application ratio corresponding to vehicle driving information after start of the one driving cycle using setting information;
   determining, by the controller, a guide DTE value reflecting the average fuel efficiency and the short fuel efficiency according to the average fuel efficiency application ratio; and
   controlling, by the controller, operation of a display device to display the guide DTE value.

16. The method of claim 15, wherein the vehicle driving information comprises a travel distance and a battery state of charge (SOC) after start of the one driving cycle.

17. The method of claim 15, wherein the determining a guide DTE value comprises:
   determining a remaining short fuel efficiency application ratio from the average fuel efficiency application ratio;
   determining guide fuel efficiency to be a value obtained by summing fuel efficiency obtained by applying the average fuel efficiency application ratio to the average fuel efficiency and fuel efficiency obtained by applying the short fuel efficiency application ratio to the short fuel efficiency; and
   determining the guide DTE value to be a value obtained by multiplying the guide fuel efficiency by a current available battery energy.

18. The method of claim 15, wherein, in determining the short fuel efficiency, the controller is configured to sequentially stores the fuel efficiencies calculated at the travel distance interval in a plurality of buffers and updates the fuel efficiencies during travel of the vehicle after start of the one driving cycle, and to determine the short fuel efficiency to be a value obtained by averaging the fuel efficiencies stored in the plurality of buffers.

19. The method of claim 15, further comprising:
   determining, by the controller, low fuel efficiency-related information and high fuel efficiency-related information according to a current vehicle driving condition; and
   determining, by the controller, a low DTE value and a high DTE value based on the low fuel efficiency-related information, the high fuel efficiency-related information, and a current available battery energy and determining a current DTE value indicating a real-time DTE,
   wherein, in the controlling operation of a display device, the controller is configured to control operation of the display device to display the low DTE value, the high DTE value, and the current DTE value together with the guide DTE value.

20. The method of claim 19, further comprising:
   determining, by the controller, a certified DTE value to be a value obtained by multiplying certified fuel efficiency of the vehicle by the current available battery energy,
   wherein, in the controlling operation of a display device, the controller is configured to control operation of the display device to display the certified DTE value together with the guide DTE value, the low DTE value, the high DTE value, and the current DTE value.

* * * * *